United States Patent [19]

Pulvermacher

[11] 3,967,810

[45] July 6, 1976

[54] PIPELINE INLET VALVE

[76] Inventor: Norman Norbert Pulvermacher, 1008 W. Main St., Princeton, Wis. 54968

[22] Filed: Apr. 28, 1975

[21] Appl. No.: 572,608

[52] U.S. Cl. .............................. 251/146; 137/381
[51] Int. Cl.² ...................... F16K 3/02; F16L 41/00
[58] Field of Search ............ 251/146, 145; 137/381, 137/382, 382.5; 285/197, 198, 199

[56] References Cited
UNITED STATES PATENTS

| | | | |
|---|---|---|---|
| 2,360,634 | 10/1944 | Allen | 251/146 X |
| 2,783,771 | 3/1957 | Thomas | 251/146 X |
| 2,881,010 | 4/1959 | Bouma | 251/146 X |
| 2,888,028 | 5/1959 | Hill | 251/146 X |
| 2,949,276 | 8/1960 | Merritt et al. | 251/146 |
| 3,011,755 | 12/1961 | Babson | 251/146 |
| 3,272,471 | 9/1966 | McCullah | 251/146 |
| 3,480,252 | 11/1969 | Simons | 251/146 |
| 3,545,719 | 12/1970 | Shullck | 251/146 |
| 3,591,132 | 7/1971 | Johnston | 251/146 |

*Primary Examiner*—William R. Cline
*Attorney, Agent, or Firm*—Henry C. Fuller

[57] ABSTRACT

A sanitary milk inlet valve for a pipe line milker includes a two-part valve housing with the valve parts having laterally extending flanges which are secured together by bolts to clamp the valve housing at a selected position on a milk pipeline. One valve part encloses a rubber seal which partially surrounds the inlet pipe and which includes a rubber boss with a through aperture which seals the inlet pipe extending into the pipeline or manifold line. The inlet pipe is easily inserted and removed for cleaning purposes. The valve housing part which receives the inlet pipe also includes a spring biased cover which moves under force of a spring to a closed position to seal the inlet pipe opening when not in use. The cover also carries a neoprene rubber seal to seal the opening. When the inlet pipe is inserted in place the cover is displaced and a concave recess in the cover engages the inlet pipe and secures the pipe in place and provides a fluid seal.

5 Claims, 4 Drawing Figures

U.S. Patent  July 6, 1976  3,967,810
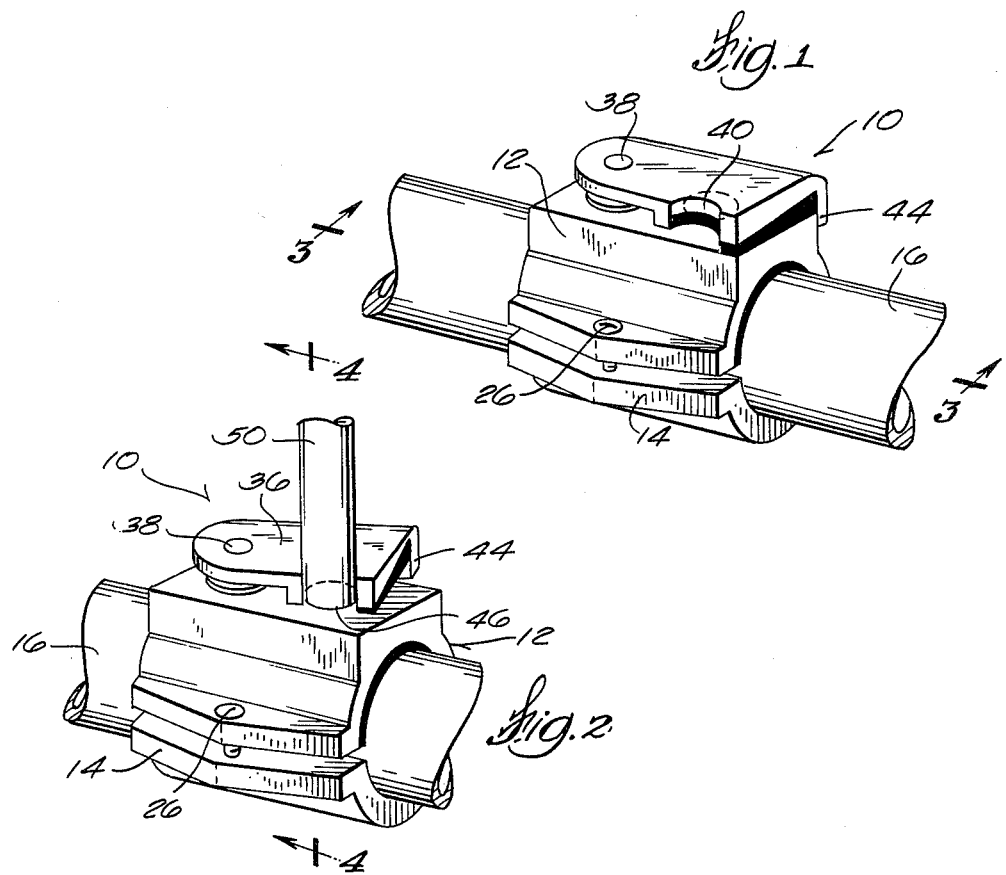
Fig. 1
Fig. 2
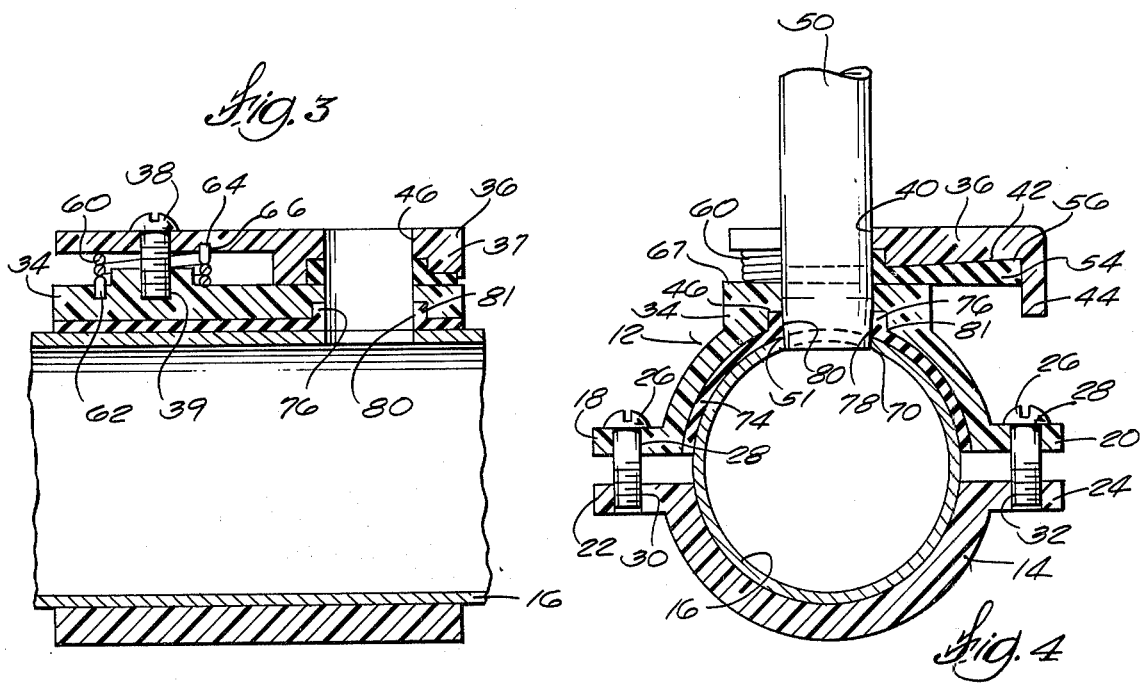
Fig. 3
Fig. 4

PIPELINE INLET VALVE

SUMMARY OF THE INVENTION

The invention provides a simple inexpensive pipe line milker valve which is easily assembled and disassembled and easily installed at any selected location along a milk pipeline which conveys milk to the storage facility. A spring loaded cover keeps the valve closed when not in use, to prevent contamination of milk. The cover is readily displaced when inserting the inlet pipe which is connected to the vacuum milker. Outturned flanges on each of the two valve housing parts are secured together and clamp the valve to the pipeline by bolts extending through one flange and threadably received in the other flange. An annular rubber boss or seal extending from a rubber pad clamped against the pipeline between the two valve parts snugly receives and seals the inlet pipe.

Further objects, advantages and features of the invention will become apparent from the following disclosure.

DESCRIPTION OF DRAWINGS

FIG. 1 is a perspective view of the milk valve in accordance with the invention.

FIG. 2 is a perspective view of the valve shown in FIG. 1 with the inlet pipe in an operative position and the valve cover displaced.

FIG. 3 is an enlarged sectional view of the valve shown in FIG. 1 along line 3—3.

FIG. 4 is a fragmentary sectional view of the valve shown in FIG. 2 along line 4—4.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows a valve in accordance with the invention which is generally designated 10 and which includes a valve body or housing with an upper housing part 12 and a lower housing part 14. As shown, the valve 10 is located on a manifold pipeline 16. The manifold pipeline 16 could be a milk supply line which conveys the milk from the cows to a storage tank. With such use there would typically be a plurality of the valves 10 for use with a number of vacuum milkers.

As best shown in FIG. 4, the upper valve housing part 12 includes outwardly or laterally extending flanges 18, 20 and the lower valve body part 14 includes laterally extending flanges 22, 24. The two valve parts 12, 14 are easily secured together by bolts or other fasteners 26 extending through apertures 28 in the flanges 18, 20 and threadably received in threaded apertures 30, 32 in the lower flanges 22, 24.

The upper valve body part 12 includes housing portion or rib 34. A valve cover 36 is pivotally connected to the portion 34 by bolt 38 threaded into an aperture 39. The valve cover 36 includes a concave recess 40 for purposes presently described and an outwardly and upwardly tapered inner surface 42 which terminates in a depending flange 44. The valve body portion 34 is provided with a through aperture 46 which receives an inlet pipe stem 50. The stem desirably has a tapered end 51. The concave recess 40 is sized to interfit with the stem 50 as shown in FIG. 2 to securely bind or clamp the stem 50 in the position shown in FIGS. 2 and 4. A neoprene seal 54 is carried by the cover 36 and has a tapered surface 56 complimentary to the tapered surface of the cover. Flanges 37 and 44 provide a retainer for the seal 54 to hold the seal in place. The valve cover 36 is movable between the closed position shown in FIG. 1 in which the seal 54 covers the opening 46, a second position as shown in FIG. 2 in which the cover and seal 54 engage the stem 50 and a third position displaced from the second position in FIG. 2 to permit withdrawal of the pipe or stem 50. The cover is biased to the closed position of FIG. 1 by a torsion spring 60 which has an end 62 engaged in the body part 34 and a spring end 64 engaged in a notch or slot 66 in the cover 36. The upper surface 67 of the rib 34 (FIG. 4) has a slight taper to cause firm sealing engagement of the seal 54 with surface 67 when the cover is closed.

As shown in FIG. 4 the manifold pipe 16 includes a through opening 70 through which the pipe stem 50 extends. A seal between the opening 70 and the pipe stem 50 is afforded by a neoprene sealing member 74 which is semi-cylindrical in shape, and which is provided with an upstanding boss 76 with an opening 78 defined by walls 80. The boss 76 is received in a counter bore 81 in the body portion 34. The walls 80 snugly receive the pipe stem 50 to provide an annular seal and hold the pipe 50 in place.

The valve 10 is easily assembled in any selected location on the manifold pipe 16. At the desired location, the aperture 70 is formed in the pipe 16 and the valve parts clamped in place. The valve body can easily be taken apart for cleaning if desired or for movement to a different location. The pipe stem 50 is easily removed when not in use and the cover provides a good seal to prevent entry of bacteria into the pipe manifold. The cover automatically closes due to spring biasing to ensure that the cover is closed when a stem is not inserted. The cover thus, prevents the possibility of air bacteria from being sucked into the milk line which can cause contamination. Inasmuch as the cover provides an outstanding seal of the opening 70, milk stone does not build up on the valve parts as a result of leaks during washing of the pipe 16.

I claim:

1. A valve assembly comprising a valve housing having first and second valve housing parts, one of said parts having a planar surface and a shoulder, a through opening in said surface for communication with a manifold line, means for clamping said valve parts in assembly and adapted for securing said valve housing in a selected location on a manifold line, said first housing part including a valve cover, said cover having a lower surface spaced from said planar surface of said first part and including an elastomeric seal occupying the space between said cover and said planar surface, said cover including a depending stop flange, means for pivotally mounting said valve cover on said first housing part for generally parallel movement with respect to said planar surface between a first position closing and sealing said through opening with said stop flange engaging said shoulder and defining said first position, a second displaced position and a third position remote from said second position with said seal free of said planar surface, a pipe sized to be received in said through opening, and said valve cover having a recess complimentary in shape to said inlet pipe and wherein said recess engages said inlet pipe when said valve cover is in said second position, and biasing means on said first part for urging said cover into said first and second positions with said valve cover seal engaging said inlet pipe in said second position and covering and sealing said opening in said first position.

2. A valve assembly in accordance with claim 1 including second elastomeric means located between said housing parts, a recess in said housing part having said opening, said sealing means having an upstanding boss located in said recess and spaced from said planar surface and said boss having an aperture for receiving said inlet pipe and sealing said inlet pipe.

3. A valve assembly in accordance with claim 1 wherein said means for securing said valve housing parts to a manifold line comprises outturned flanges on said first and second housing parts and fasteners securing said flanges together.

4. The valve assembly of claim 1 in combination with a manifold pipe and including second sealing means located between said first housing and said manifold pipe and an aperture in said manifold pipe for receiving said inlet pipe and said second sealing means including an annular seal for said inlet pipe.

5. The valve assembly of claim 4 wherein said second sealing means comprises a neoprene pad having a curvature complimentary to the curvature of said manifold pipe and an upstanding boss on said pad having an aperture for receiving said inlet pipe.

* * * * *